US009088410B2

(12) United States Patent
Ashley et al.

(10) Patent No.: US 9,088,410 B2
(45) Date of Patent: *Jul. 21, 2015

(54) ACCESSING LOCAL APPLICATIONS WHEN ROAMING USING A NFC MOBILE DEVICE

(71) Applicant: International Business Machines Corporation, Armonk, NY (US)

(72) Inventors: Paul A. Ashley, Toowong (AU); Anthony M. Butler, Dubai (AE); Ravi Kothari, New Delhi (IN); Yu-Chen Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,340

(22) Filed: Sep. 2, 2014

(65) Prior Publication Data

US 2014/0376722 A1    Dec. 25, 2014

Related U.S. Application Data

(63) Continuation of application No. 13/925,873, filed on Jun. 25, 2013.

(51) Int. Cl.
| | |
|---|---|
| *H04L 29/06* | (2006.01) |
| *G06F 21/00* | (2013.01) |
| *H04L 9/14* | (2006.01) |
| *H04W 12/04* | (2009.01) |
| *G06F 21/57* | (2013.01) |

(52) U.S. Cl.
CPC *H04L 9/14* (2013.01); *G06F 21/57* (2013.01); *H04W 12/04* (2013.01); *H04L 2209/24* (2013.01); *H04L 2209/80* (2013.01)

(58) Field of Classification Search
CPC ... H04L 9/14; H04L 2209/80; H04L 2209/24; G06F 21/57; H04W 12/04
See application file for complete search history.

(56) References Cited

U.S. PATENT DOCUMENTS

| | | | |
|---|---|---|---|
| 8,171,525 B1 | 5/2012 | Pelly et al. | |
| 2002/0025046 A1* | 2/2002 | Lin | 380/282 |

(Continued)

FOREIGN PATENT DOCUMENTS

| | | |
|---|---|---|
| WO | 2012080740 A1 | 6/2012 |
| WO | 2012085593 A1 | 6/2012 |
| WO | 2012154780 A2 | 11/2012 |

OTHER PUBLICATIONS

NFC Times, TSM Proposes Global NFC Service Roaming Network, http://nfctimes.com/news/tsm-proposes-global-nfc-service-roaming-network, accessed on Dec. 11, 2012.

(Continued)

*Primary Examiner* — Lisa Lewis
(74) *Attorney, Agent, or Firm* — Teddi E. Maranzano

(57) ABSTRACT

A method of accessing local applications when roaming on a NFC mobile device may include creating a first partition and a second partition on a secure element (SE) of a subscriber identification module (SIM) of a near field communication (NFC) enabled device. The home TSM separates the first partition and the second partition by public key encryption. The home TSM generates cryptographic keys in response to a request by a roaming TSM for access to the second partition of the SIM. Following the exchange of security keys, the home TSM delegates to the roaming TSM access to the second partition of the SIM.

7 Claims, 3 Drawing Sheets

(56) References Cited

U.S. PATENT DOCUMENTS

2010/0067718 A1* 3/2010 Amsterdam et al. .......... 381/107
2011/0130117 A1   6/2011 Fan et al.
2011/0246738 A1* 10/2011 Nakamura et al. ............ 711/163

OTHER PUBLICATIONS

Pending U.S. Appl. No. 13/925,873, entitled "Accessing Local Applications When Roaming Using a NFC Mobile Device", filed Jun. 25, 2013.

* cited by examiner

US 9,088,410 B2

ACCESSING LOCAL APPLICATIONS WHEN ROAMING USING A NFC MOBILE DEVICE

CROSS REFERENCE

The present application is a continuation of and claims priority under 35 U.S.C. §120 of U.S. patent application Ser. No. 13/925,873, filed on Jun. 25, 2013, which is incorporated by reference in its entirety.

FIELD

The present disclosure relates generally to roaming service and, more particularly, to service models for roaming mobile devices.

BACKGROUND

In a Near-Field Communications (NFC) mobile device ecosystem, a Trusted Service Manager (TSM) acts an intermediary between an application or services provider, the Managed Network Operator (MNO), and the MNO's customer, who is the user of the NFC mobile device. Upon request from the user, the TSM installs an application on the NFC mobile device so long as the user's MNO shares the cryptographic keys with the TSM and allows the access. However, a user traveling outside his home MNO, such as in another country, will not be able to take advantage of local NFC-enabled services since the local MNO and TSM will not have security access to the Secure Element (SE) on the user's NFC mobile device.

It may therefore be desirable, among other things, for a user to be able to access local applications when roaming using a NFC mobile device.

SUMMARY

According to an aspect of the invention, a method to access local applications when roaming using a NFC mobile device may include creating a first partition and a second partition on a Secure Element (SE) of a Subscriber Identification Module (SIM) of a Near-Field Communication (NFC) enabled device; separating the first partition and the second partition by encryption; generating encryption keys by a first Trusted Service Manager (TSM) for the second partition in response to a request by a second TSM for access to the second partition; delegating from the first TSM to the second TSM access to the second partition using the generated encryption keys; and resetting the generated encryption keys.

In another aspect of the invention, a computer program product for accessing local applications when roaming using a NFC mobile device may be provided. The computer program product may include an operating system program embodied on a computer readable storage medium, whereby the operating system program includes code executable by a processor to perform a method. The method may accordingly include creating a first partition and a second partition on a SE of a SIM of a NFC enabled device; separating the first partition and the second partition by encryption; generating encryption keys by a first TSM for the second partition in response to a request by a second TSM for access to the second partition; delegating from the first TSM to the second TSM access to the second partition using the generated encryption keys; and resetting the generated encryption keys.

In another aspect of the invention, a computer system for accessing local applications when roaming using a NFC mobile device is provided. The computer system may include one or more processors, one or more computer-readable storage devices, and a plurality of program instructions stored on at least one of the one or more storage devices for execution by at least one of the one or more processors. The plurality of program instructions may include program instructions to create a first partition and a second partition on a SE of a SIM of a NFC enabled device; program instructions to separate the first partition and the second partition by encryption; program instructions to generate encryption keys by a first TSM for the second partition in response to a request by a second TSM for access to the second partition; program instructions to delegate from the first TSM to the second TSM access to the second partition using the generated encryption keys; and program instructions to reset the generated encryption keys.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention will now be described with reference to the figures. As used herein, "Near-Field Communication" (NFC) may refer to a wireless connectivity standard and the technology to enable short-range communication between electronic devices, such as a smartphone and Point-of-Sale (POS) terminal, or similar NFC enabled devices.

A "Mobile Network Operator" (MNO), as used herein, may refer to a provider of wireless voice and data communication services. The MNO may be called a "home" MNO when referring to services the MNO provides for its subscribers.

Figure 3:
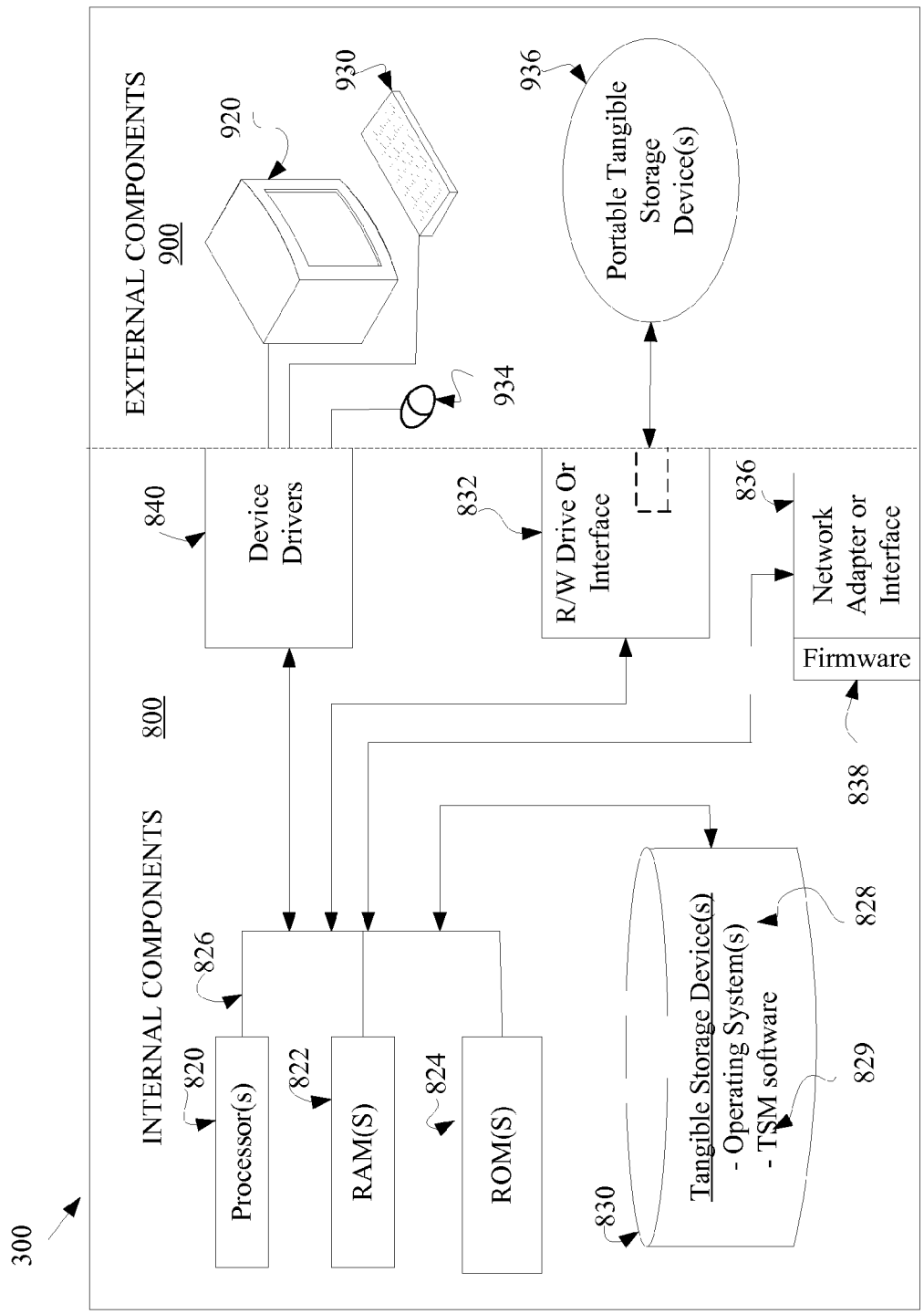
FIG. 3 is a block diagram of hardware and software according to an exemplary embodiment.

A "Trusted Service Manager" (TSM), as referred to herein, performs a role in NFC architecture that may include provisioning applications or services Over the Air (OTA) to NFC-enabled devices on behalf of a MNO. The TSM, therefore, may be embodied as a computer system consisting of one or more software modules that exploit the hardware and software environment of a computer 300 (FIG. 3). While the MNO may also include the TSM function, the TSM may be a trusted independent third party.

A provider of software applications or related services that may be installed on a NFC mobile device may be called an "Application Provider" (AP).

In general, the term "roaming" may refer to the ability of a user to access services provided through a MNO other than the user's home MNO. Therefore, a "roaming" MNO is one that may extend services to a subscriber of an MNO other than the home MNO. Similarly, a "roaming" TSM may broker services, such as from a "roaming" AP, on behalf of a "roaming" MNO. A reference to MNO, TSM, or AP should be interpreted as the "home" MNO, "home" TSM, or "home" AP respectively, unless the distinction of "roaming" is made.

As used herein, a "Subscriber Identity Module" (SIM) may refer to an integrated circuit as embedded on a removable card that securely stores user identity and authentication information for users of mobile telephone-type devices, such as phones, tablets, or computers.

A "Secure Element", also referred to as a SE, may represent a tamper-resistant component of a NFC-enabled device, for example a mobile phone, which is specialized to securely store applications and confidential data. While an exemplary SE may be embodied on a SIM card, a SE may also be embodied in other configurations such as, for example, a Solid State Device (SSD) a cloud computing platform, a Secure Digital (SD) card, or a mobile device. Therefore, it may be appreciated by one of ordinary skill in the art that depicting SE partitions on a SIM card, such as in FIG. 2, provides only an illustration of a possible configuration and not a limitation on the location of the SE partitions.

Figure 1:
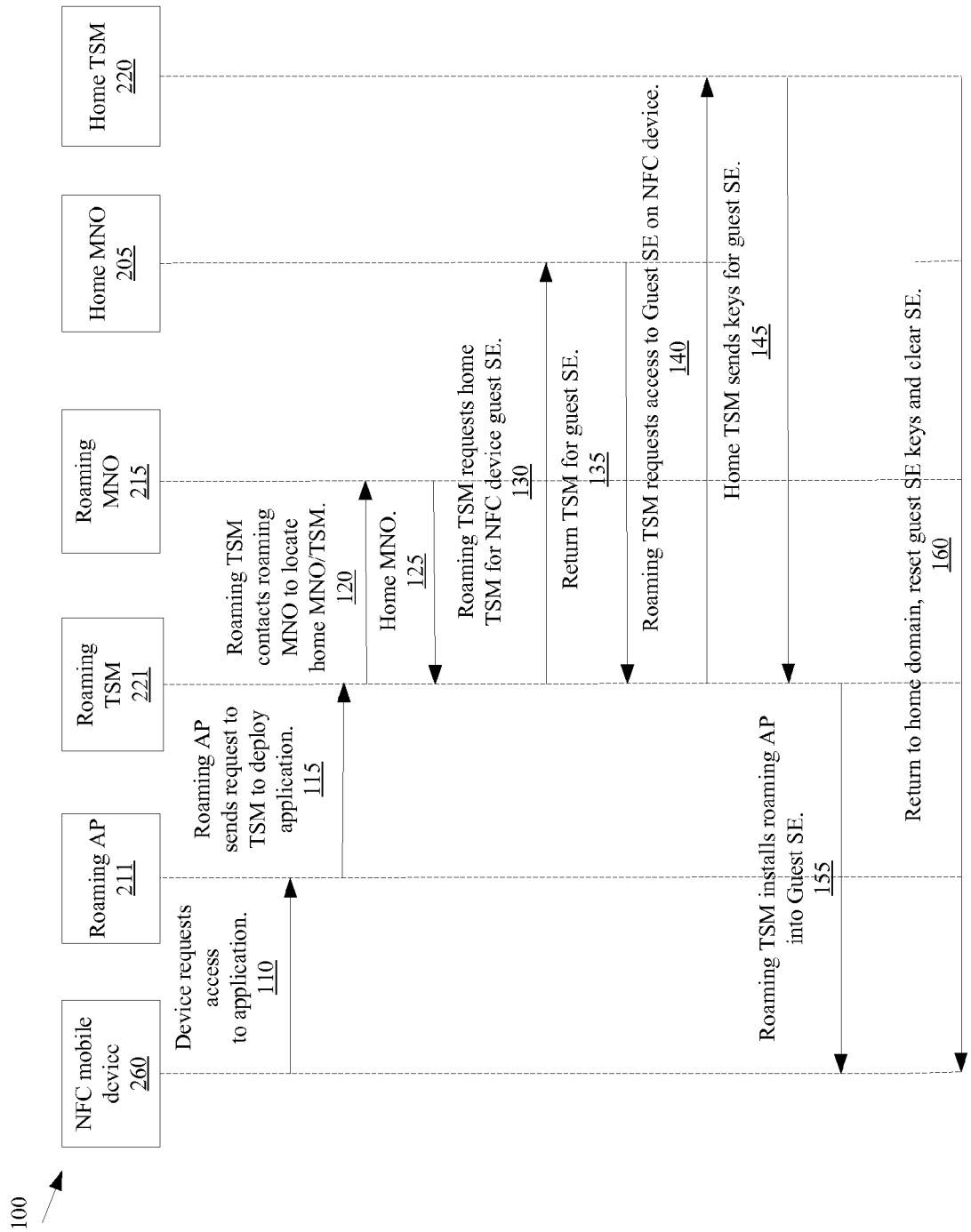
FIG. 1 is a flow diagram illustrating an overview of a method to access local applications when roaming on a NFC mobile device, according to one exemplary embodiment.
Figure 2:
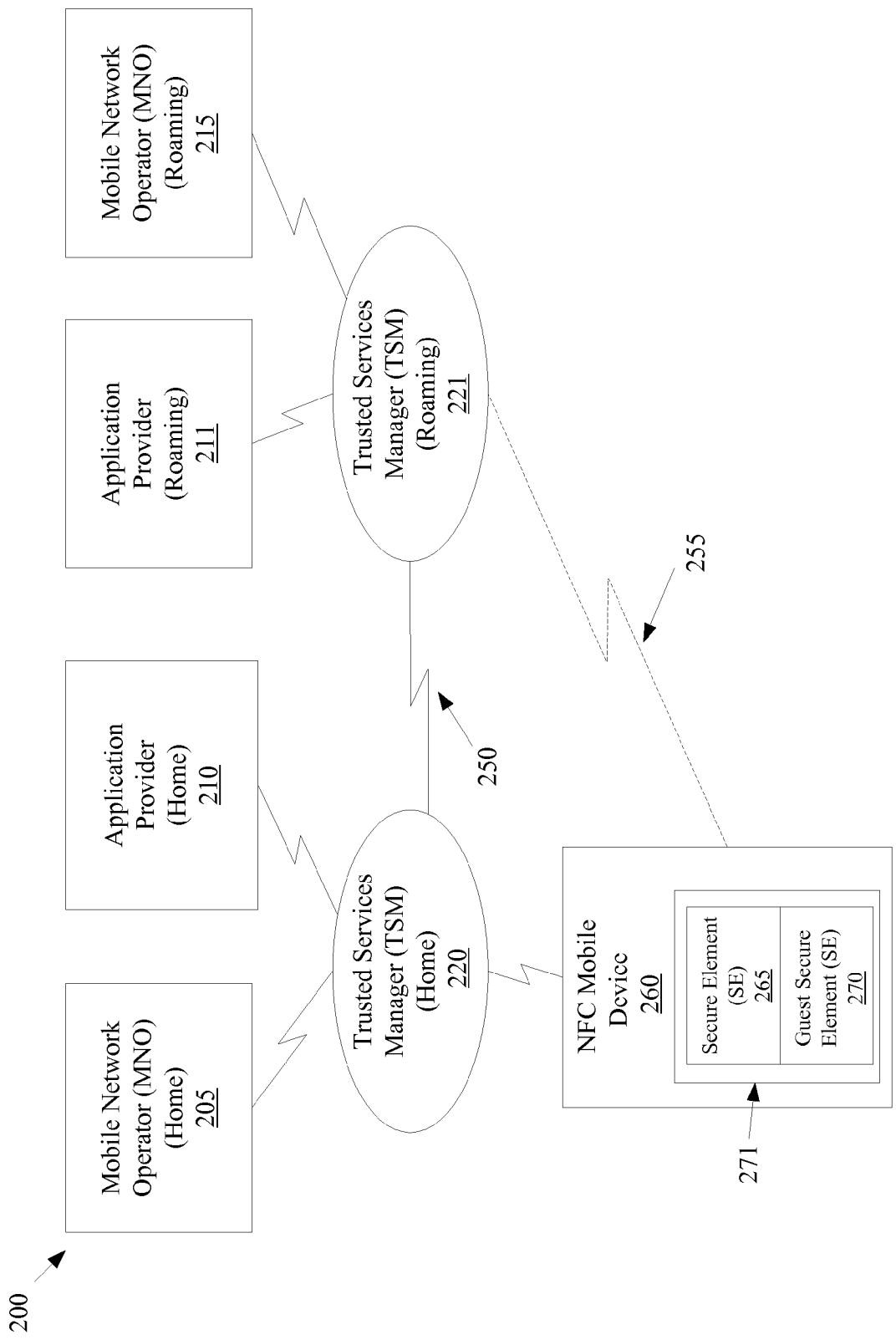
FIG. 2 is a schematic diagram of an exemplary software and hardware environment according to the embodiment of the invention depicted in FIG. 1.

Referring to FIGS. 1 and 2, method 100 and system 200 provision a NFC mobile device 260 (FIG. 2) with services and applications while on a roaming MNO 215 (FIG. 2).

A cell phone purchaser also chooses a MNO 205 wireless service provider from which to receive data and communications services. The TSM 220 acts as a neutral broker to securely distribute, provision, and manage applications on the MNO 205 customer's NFC mobile device 260. In an exemplary embodiment, when a subscriber purchases a new NFC mobile device 260, as part of the initialization process, two or more partitions are created on the NFC mobile device's SE, either by the TSM 220 on behalf of the MNO 205, or by the MNO 205 directly. The first SE 265 represents a primary partition where the TSM 220 installs applications from an AP 210 within the MNO 205. Data stored on the primary partition, (SE 265) is persistent.

In an exemplary embodiment, data stored on other partitions (SE 270) only persists while roaming. Other partitions on the SIM card 271, such as a Guest SE 270, may be used by the TSM 220, or a roaming TSM 221 to store non-persistent data such as applications or data from a roaming AP 211. Each partition is isolated from the others and is protected by asymmetric key algorithms, such as those that may be incorporated in public key encryption. Therefore, absent a formal agreement between the home service providers (MNO 205 and TSM 220) and roaming service providers (roaming MNO 215 and roaming TSM 221) depicted as a network or OTA connection 250 (FIG. 2), a user's NFC mobile device 260 may not have access to services managed by a roaming MNO 215 or roaming TSM 221, for example through a network or OTA connection 255 (FIG. 2).

At 110, a user may wish to make a POS purchase with a NFC mobile device 260 to purchase a train ticket, for example, download a transit schedule, or perform a similar task. Where the needed application may be transparently requested by the NFC mobile device 260 and deployed by the AP 210 through the TSM 220 intermediary, here at 110, the roaming TSM 221 does not have security keys to directly access the SIM card 271 on the NFC mobile device 260. Therefore, at 115 the roaming AP 211 first contacts the roaming TSM 221 to locate the TSM 220 to seek the authority to update a Guest SE 270.

At 120, the roaming TSM 221 contacts its partner MNO, which is the roaming MNO 215. In general, MNOs may negotiate business agreements with each other as business partners for cooperation in billing and authorizing services to visiting subscribers. Consequently, at 125, the MNO 205 may have an existing agreement with the roaming MNO 215 that would authorize the roaming TSM 221 to allow the roaming AP 211 to install the requested application on the Guest SE 270. Alternatively, an agreement may be created in real time between the MNO 205 and roaming MNO 215 when the initial request to access roaming services is made.

The roaming TSM 221, at 130, may now request that the MNO 205 return, at 135, the identity of the managing TSM 220 for the Guest SE 270. At 140, the roaming TSM 221 formats and sends a request to the TSM 220 for access to the Guest SE 270. In response, if the TSM 220 trusts the request from the roaming TSM 221, then at 145 the TSM 220 delegates to the roaming TSM 221 access to the Guest SE 270 by an exchange of security keys. For example, the TSM 220 may send its public key to the roaming TSM 221. The roaming TSM 221 may generate a random session key which it sends to the TSM 220 in a message encrypted using the roaming TSM's 221 public key. The TSM 220 may then use its private key to decrypt the message and extract the session key. To ensure the integrity of the security keys, the TSM 220 sends a confirmation message to the roaming TSM 221, encrypted using the session key. In this manner, the Guest SE 270 security keys may be sent to the roaming TSM 221 using the session key. Further, the separation of the Guest SE 270 partitions from the SE 265 by security keys may prevent disruption of service from hacking or other damage to the contents of the SE 265.

At 155, the roaming TSM 221 installs the requested application, data, or service to the Guest SE 270, signing the communication using the Guest SE 270 security keys. Additionally, the roaming TSM 221 may continue to update the applications, data, or service that it installed on the Guest SE 270 while the NFC mobile device 260 remains within the roaming MNO 215. When, at 160, the NFC mobile device 260 returns to the MNO 205, the TSM 220 may delete any applications or data in the Guest SE 270, and reset the security keys.

In another exemplary embodiment, the data and applications stored in the Guest SE 270 may be backed up by the TSM 220 in a storage location at the TSM 220, for later recall by the NFC mobile device 260. Therefore, a business traveler may maintain a portfolio of frequently-accessed country or region specific applications and restore them as needed. Additionally, having multiple Guest SE 270 partitions may enable the user to pre-provision applications on the NFC mobile device 260 prior to departure to another country or region where roaming is anticipated.

Referring now to FIG. 3, computing device 300 may include respective sets of internal component 800 and external components 900. Each of the sets of internal components 800 includes one or more processors 820, one or more computer-readable RAMs 822 and one or more computer-readable ROMs 824 on one or more buses 826, one or more operating systems 828, one or more programs 829, and one or more computer-readable tangible storage devices 830. The one or more operating systems 828 and programs 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 may be a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838, operating system 828, and programs 829 that are associated with computing device 400, can be downloaded to computing device 400 from an external computer (e.g., server) via a network (for example, the Internet, a local area network or other, wide area network) and respective network adapters or interfaces 836. From the network adapters (or switch port adaptors) or interfaces 836, the firmware 838 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-3 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based based systems that perform the specified functions or acts, or combinations of special purpose hardware and computer instructions.

What is claimed is:

1. A method of accessing local applications when roaming using a Near-Field Communication (NFC) mobile device, comprising:
    creating at least a first partition and a second partition on a Secure Element (SE) of a Subscriber Identification Module (SIM) of a NFC enabled device, wherein the first partition and the second partition are created by a home Managed Network Operator (MNO) upon the home MNO initializing the NFC enabled device into the home MNO network;
    separating the first partition and the second partition by encryption;
    generating encryption keys by a first Trusted Service Manager (TSM) for the second partition in response to a request by a second TSM for access to the second partition; and
    delegating from the first TSM to the second TSM access to the second partition using the generated encryption keys.

2. The method of claim 1, wherein the first TSM is a home TSM, the second TSM is a roaming TSM, a first MNO is the home MNO, and a second MNO is a roaming MNO, and wherein the home MNO manages the first partition and the second partition.

3. The method of claim 1, wherein the first partition is a primary partition and the second partition is a guest partition, and wherein the home MNO creates the first partition and the second partition upon initialization of the NFC enabled device.

4. The method of claim 1, further comprising:
    sending a request to install a roaming application from a roaming application provider to the second TSM;
    requesting, by the second TSM, that the second MNO identify the home MNO;
    requesting, by the second TSM, that the home MNO identify the first TSM for the second partition; and
    sending a request for access to the second partition to the identified first TSM from the second TSM.

5. The method of claim 1, wherein delegating further comprises:
    generating a session key by the second TSM;
    sending the session key to the first TSM from the second TSM, in a message encrypted by the second TSM's public key;
    decrypting the message, by the first TSM, using a private key, and extracting the session key from the decrypted message; and
    verifying the identities of the first TSM and the second TSM, wherein the first TSM sends a confirming message to the second TSM encrypted using the session key.

6. The method of claim 4, further comprising:
    backing up the roaming application located on the second partition for use during subsequent roaming in a region corresponding to the second TSM and restoring the roaming application to the second partition for use during subsequent roaming in a region corresponding to the second TSM; and
    pre-provisioning at least one application on the NFC enabled device prior to roaming to a second MNO.

7. The method of claim 1, further comprising:
    resetting the generated encryption keys and deleting applications and data in the second partition in response to the NFC enabled device returning to the home MNO.

* * * * *